US012389434B2

(12) United States Patent
Islam et al.

(10) Patent No.: US 12,389,434 B2
(45) Date of Patent: Aug. 12, 2025

(54) DOWNLINK CONTROL CHANNEL SIGNALING FOR IMPROVED POWER CONSUMPTION AT A USER EQUIPMENT (UE)

(71) Applicant: Intel Corporation, Santa Clara, CA (US)

(72) Inventors: Toufiqul Islam, Sunnyvale, CA (US); Hong He, Sunnyvale, CA (US); Gregory Ermolaev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/485,643

(22) Filed: Oct. 12, 2023

(65) Prior Publication Data
US 2024/0040598 A1 Feb. 1, 2024

Related U.S. Application Data

(63) Continuation of application No. 17/256,026, filed as application No. PCT/US2019/060338 on Nov. 7, 2019, now abandoned.

(Continued)

(51) Int. Cl.
*H04W 72/53* (2023.01)
*H04B 7/06* (2006.01)
(Continued)

(52) U.S. Cl.
CPC .......... *H04W 72/53* (2023.01); *H04B 7/0626* (2013.01); *H04B 17/309* (2015.01);
(Continued)

(58) Field of Classification Search
CPC ............. H04W 72/53; H04W 52/0209; H04W 72/0453; H04W 72/1273; H04W 72/23;
(Continued)

(56) References Cited

U.S. PATENT DOCUMENTS 10,785,012 B2 * 9/2020 Pelletier .................. H04L 5/001
2013/0315113 A1 * 11/2013 Seo ....................... H04L 5/0098
370/280

(Continued)

OTHER PUBLICATIONS

3rd Generation Partnership Project; Technical Specification Group Radio Access Network; NR; Multiplexing and channel coding; 3GPP TS 38.212 v. 15.7.0; Sep. 2019; 101 pages.
(Continued)

*Primary Examiner* — Atique Ahmed
(74) *Attorney, Agent, or Firm* — Alliance IP, LLC

(57) ABSTRACT

Technology for a user equipment (UE) operable to decode a channel state information reference signal (CSI-RS) resource received from a Next Generation NodeB (gNB) is disclosed. The UE can decode a downlink control channel signal received from the gNB in a first bandwidth part. The downlink control channel signal may include an index of a second bandwidth part, and an indication of a CSI-RS transmission in the second bandwidth part having the index. The UE can switch from the first bandwidth part to the second bandwidth part. The UE can decode the CSI-RS transmission received from the gNB in the second bandwidth part.

16 Claims, 10 Drawing Sheets

Related U.S. Application Data

(60) Provisional application No. 62/790,900, filed on Jan. 10, 2019, provisional application No. 62/758,341, filed on Nov. 9, 2018.

(51) Int. Cl.
   *H04B 17/309* (2015.01)
   *H04L 5/00* (2006.01)
   *H04W 52/02* (2009.01)
   *H04W 72/0453* (2023.01)
   *H04W 72/1273* (2023.01)
   *H04W 72/23* (2023.01)
   *H04W 76/28* (2018.01)

(52) U.S. Cl.
   CPC .......... *H04L 5/0048* (2013.01); *H04L 5/0094* (2013.01); *H04W 52/0209* (2013.01); *H04W 72/0453* (2013.01); *H04W 72/1273* (2013.01); *H04W 72/23* (2023.01); *H04W 76/28* (2018.02)

(58) Field of Classification Search
   CPC ... H04W 76/28; H04B 7/0626; H04B 17/309; H04L 5/0048; H04L 5/0094; H04L 5/005; H04L 5/0053
   See application file for complete search history.

(56) References Cited

U.S. PATENT DOCUMENTS

| | | | |
|---|---|---|---|
| 2017/0332386 A1* | 11/2017 | Li | H04W 72/56 |
| 2019/0052377 A1 | 2/2019 | Hwang et al. | |
| 2019/0132862 A1 | 5/2019 | Jeon et al. | |
| 2019/0313386 A1 | 10/2019 | Hwang et al. | |
| 2020/0029315 A1* | 1/2020 | Lin | H04W 52/0245 |
| 2020/0029316 A1* | 1/2020 | Zhou | H04W 74/0833 |
| 2020/0107353 A1* | 4/2020 | Jung | H04W 72/23 |
| 2020/0213978 A1* | 7/2020 | Iyer | H04L 1/1812 |
| 2020/0245333 A1* | 7/2020 | Lin | H04L 1/0026 |
| 2020/0404690 A1 | 12/2020 | Lee et al. | |
| 2021/0204231 A1 | 7/2021 | Harada et al. | |
| 2022/0053546 A1* | 2/2022 | Shi | H04W 72/1273 |
| 2022/0078650 A1* | 3/2022 | Lee | H04W 24/08 |
| 2022/0210866 A1 | 6/2022 | He et al. | |
| 2022/0216944 A1* | 7/2022 | Muruganathan | H04W 72/0446 |

OTHER PUBLICATIONS

Intel Corporation; "Triggering UE adaptation to power consumption characteristics," 3GPP TSG RAN WG1 Meeting #95, R1-1812514; Spokane, Washington; Nov. 2018; 5 pages.

Nokia; "On UE adaptation to the traffic;" 3GPP TSG RAN WG1 Meeting #95, R1-1813620; Spokane, Washington; Nov. 2018; 12 pages.

PCT International Preliminary Report on Patentability issued in PCT/US2019/060338, dated May 11, 2021; 8 pages.

PCT International Search Report and Written Opinion issued in PCT/US2019/060338, dated Apr. 9, 2020; 11 pages.

Qualcomm Incorporated; "Triggering Adaptation of UE Power Consumption Characteristics;" 3GPP TSG-RAN WG1 Meeting #95, R1-1813448; Spokane, Washington; Nov. 2018; 17 pages.

ZTE; "On Adaptation aspects for NR UE power consumption reduction," 3GPP TSG RAN WG1 Meeting #95, R1-1812421; Spokane, Washington; Nov. 2018; 10 pages.

ZTE; "Remaining Issues on TRS;" 3GPP TSG RAN WG1 Meeting #93, R1-1805835; Busan, Korea; May 2018; 3 pages.

\* cited by examiner

DOWNLINK CONTROL CHANNEL SIGNALING FOR IMPROVED POWER CONSUMPTION AT A USER EQUIPMENT (UE)

CROSS-REFERENCE TO RELATED APPLICATIONS

This application is a continuation of U.S. patent application Ser. No. 17/256,026, filed Dec. 24, 2020, which is a national stage application under 35 U.S.C. § 371 of PCT International Application No. PCT/US2019/060338, filed on Nov. 7, 2019, and entitled "DOWNLINK CONTROL CHANNEL SIGNALING FOR IMPROVED POWER CONSUMPTION AT A USER EQUIPMENT (UE)," which claims the benefit of U.S. Provisional Application No. 62/758,341, filed Nov. 9, 2018 and U.S. Provisional Application No. 62/790,900, filed Jan. 10, 2019, each of which is hereby incorporated by reference herein in its entirety.

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
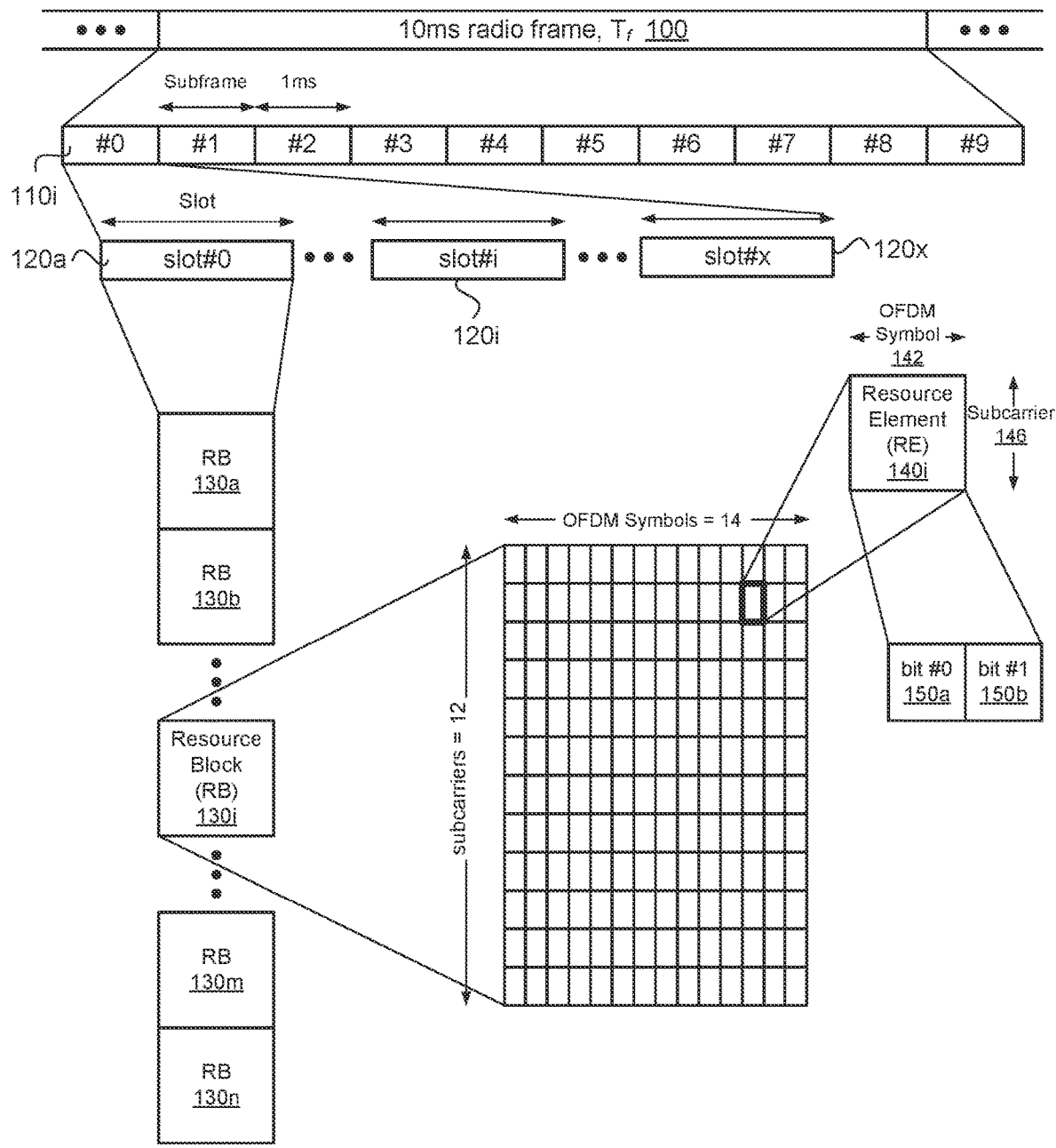
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/μms, where μ=1 for 15 kHz subcarrier spacing, μ=2 for 30 kHz, μ=4 for 60 kHz, μ=8 for 120 kHz, and μ=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140$i$ can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one example, energy efficiency is important for operation of Fifth Generation (5G)/New Radio (NR) UEs, which can have a diverse range of supported applications as compared to LTE devices. Further, identifying a suitable network assistance mechanism that provides a resource allocation that is appropriate for a given UE's specification and configuration is important. Thus, different UE specific control channel signaling mechanisms related to resource allocation and channel state information (CSI) reporting enhancements to facilitate UE power saving are described herein.

In one example, several UE specific downlink control channel signaling mechanisms are described herein. In one example, an uplink (UL) scheduling grant can trigger aperiodic CSI reporting for a different downlink (DL) bandwidth (BW) part than a DL BW part where the UL grant was received. In another example, one UL or DL grant can schedule multiple transport blocks/hybrid automatic repeat request (HARQ) processes for a UE and corresponding HARQ feedback, either in a bundled or separate manner. Further, power saving signaling using one or more bits in existing fields of an UL and/or DL grant can be provided, which are otherwise used for a different purpose.

In one example, in a multi-slot scheduling technique, one or more physical downlink shared channels (PDSCHs) or transport blocks can be scheduled to span multiple slots. To enable UE power saving, a UE can skip physical downlink control channel (PDCCH) monitoring when multi-slot scheduling downlink control information (DCI) is received. Further, indication mechanisms to trigger the UE to skip PDCCH monitoring are described herein.

In one example, the methodologies described herein can be applied to a UE in radio resource control (RRC) connected mode, where the UE can be in an always ON active mode or in a connected discontinuous reception (DRX) mode. The methodologies described herein can be considered for any duplex scheme, such as frequency division duplex (FDD) or time division duplex (TDD), licensed or unlicensed systems. In the following description, a slot implies 14 OFDM symbols, however, it should be understood that methodologies generally apply to any definition of slot comprising other integer number of symbols. Further, several DCI design solutions are described herein to facilitate faster UE adaptation and/or more UE power saving.

In one example, in an NR system, a UE can be configured with multiple BW parts, which can have different sizes and numerologies, i.e., subcarrier spacing. For example, a UE can be configured with BW part B1 and B2, where a size of B2 can be larger than a size of B1. The network can place the UE in active BW part B1 when traffic load is low so that power saving can be achieved. When there is a need to switch to larger BW part B2, the network can trigger a scheduling DCI in B1 so that data is delivered in B2 after UE's RF BW switches to B2. However, a resource allocation in scheduling DCI usually depends on CSI feedback from the UE so that appropriate link adaptation can be done from the network side. The UE can feed back a CSI report based on measurements performed on a channel state information reference signal (CSI RS). The UE can only receive the CSI RS in an active BW part. As BW part B2 is not active before receiving the scheduling DCI in B1, a scheduling decision may not be based on up-to-date CSI information of the BW part B2.

In one example, existing approaches include transmission of an UL grant for triggering aperiodic CSI-RS transmission in the same DL BW part where the UL grant was received. If the UL grant is triggered after the UE switches to BW part 2, the CSI reporting would be delayed. Similarly, periodic CSI RS transmission occasions configured in BW part 2 can be sparse and a transmission occasion may not coincide in time right after the UE switches to BW part 2.

A first technique addresses this problem so that fast CSI acquisition can be done in the switched BW part, e.g., B2 in this example.

In one configuration, the UE can receive a layer 1 (L1) trigger from the network in a first BW part, where the L1 trigger can indicate a second BW part and a CSI RS resource in the second BW part. In one example, the L1 trigger can be a DCI transmitted in a PDCCH or in a sequence. The PDCCH can be, for example, an UL or DL scheduling grant.

Figure 2:
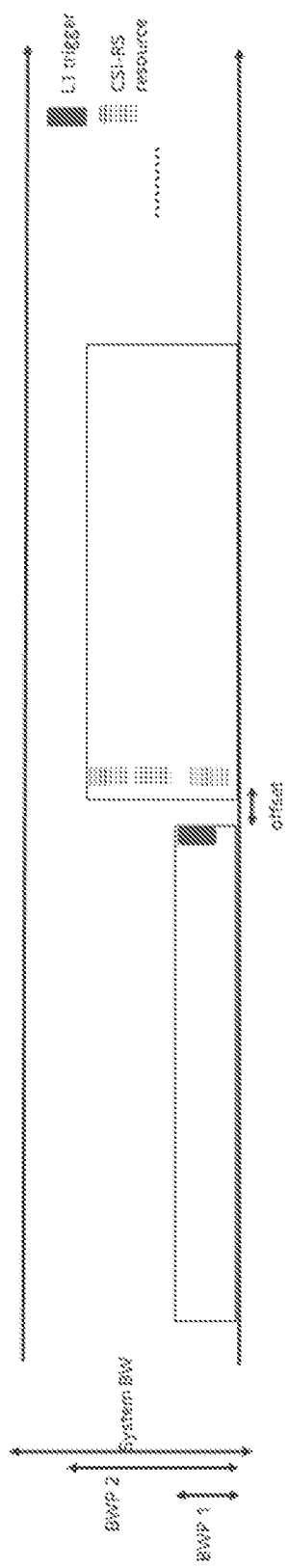
FIG. 2 illustrates a channel state information reference signal (CSI-RS) resource obtained in a second bandwidth (BW) part after an offset from a layer 1 (L1) trigger is received in a first BW part in accordance with an example.

FIG. 2 illustrates an example of a channel state information reference signal (CSI-RS) resource being obtained in a second bandwidth (BW) part after an offset from a layer 1 (L1) trigger is received in a first BW part. The CSI-RS resource can be obtained in the second BW part after an offset from the L1 trigger is received in the first BW part. In one example, the offset can be from the location where L1 trigger is received. In another example, the offset can be from a system sub-frame boundary or any other reference point. In this example, one instance of a CSI-RS transmission (i.e., aperiodic) is indicated. Further, one instance of the CSI-RS transmission can be configured to occupy a full or partial BWP, and can include resources corresponding to N antenna ports, where N is equal to or greater than 1 (i.e. N=>1 antenna ports). Therefore, in this configuration of the first technique, the L1 trigger in BW part 1 can indicate to the UE to switch to BW part 2 and monitor CSI-RS resource in the switched BW part, and the CSI-RS resource can be located in the BW part 2 after an offset.

Figure 3:
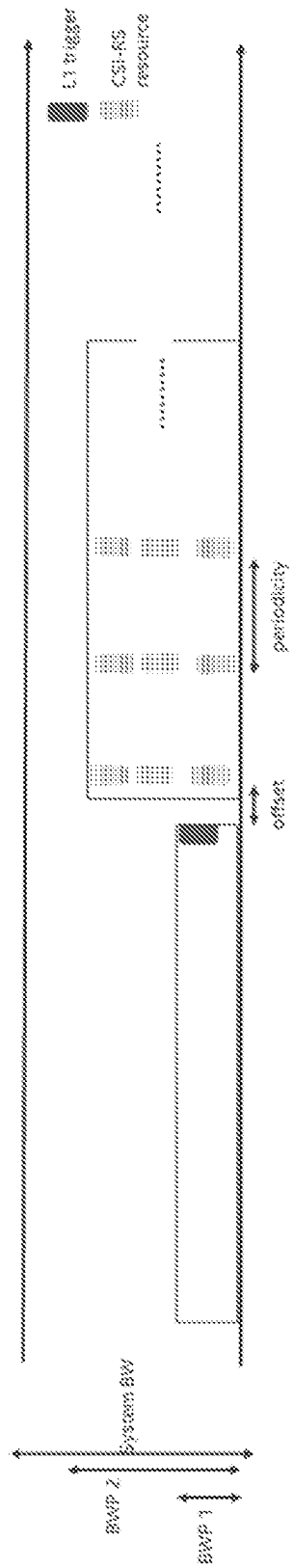
FIG. 3 illustrates an L1 signal that triggers a UE to monitor a periodic CSI-RS in a second BW part in accordance with an example.

FIG. 3 illustrates an example of an L1 signal that triggers a UE to monitor a periodic CSI-RS in a second BW part. Here, the L1 signaling triggers the UE to monitor the periodic CSI-RS in BW part 2. Further, in this example, the L1 trigger in BW part 1 can indicate to the UE to switch to BW part 2 and monitor a periodic CSI-RS resource in the switched BW part, and CSI-RS resource monitoring in the BW part 2 can start after an offset.

In one example, a UL scheduling grant in BW part 1 can trigger the UE to monitor an aperiodic CSI RS in BW part 2. The UL grant may or may not indicate a valid resource allocation for an UL data channel, such as the PUSCH. In one example, a CSI request field in DCI format 0_1 (i.e., non-fall back UL scheduling DCI) can be modified to indicate the CSI RS resource and an index of a DL BW part where to monitor the CSI RS. An offset to the CSI RS location can be based on a numerology of BW part 2 or 1 and can be configured in a number of symbol(s) or slot(s). For example, if the CSI request field has N>P=>1 bits, then P bits can be used to indicate the DL BW part index and N−P bits can be used to indicate CSI RS resource, e.g., an index of a CSI RS resource configuration or resource set, where N and P are positive integers. In another option, an additional field can be added in the UL grant DCI to indicate the DL BW part, and the CSI request field can indicate a CSI RS resource, e.g., an index of a CSI RS resource configuration or a CSI RS resource set.

In another example, an L1 trigger can be a DL scheduling DCI in a PDCCH received in BW part 1 to trigger an aperiodic CSI RS transmission in BW part 2. The DL scheduling grant may or may not include a valid resource allocation for the PDSCH, either in BW part 1 or 2. Similarly as above, the DL grant can consist of a field that, when comprises N>P=>1 bits, then P bits can be used to indicate the DL BW part index where to monitor the CSI RS and N−P bits can be used to indicate the CSI RS resource, e.g., an index of a CSI RS resource configuration or resource set. Alternatively, the BW part index and the CSI RS resource can be indicated in separate fields.

In another example, the L1 trigger can be a wake-up signal (WUS) received by the UE in BW part 1 if the UE is operating in a DRX mode. The L1 trigger can be received before a configured ON duration timer start occasion. The L1 trigger can potentially indicate the UE to monitor the CSI RS after the configured ON duration starts. In one example, the UE can switch to a different BW part when the configured ON duration starts after the WUS is received. In this case, the L1 trigger can indicate the BW part index where the UE camps when the ON duration starts or during the ON duration and/or the CSI RS resource, e.g., an index of a CSI RS resource configuration or a CSI RS resource set.

In one configuration, in a second technique, if a UE receives a large packet, the packet may need several PDSCHs or transport block transmissions to complete. Instead of scheduling each PDSCH independently, the network can jointly schedule N=>1 PDSCHs together, where each PDSCH can occupy a symbol group or a slot or a group of slots. The HARQ feedbacks of the corresponding PDSCHs can be concatenated and transmitted in a common UCI resource, such as in a PUCCH or PUSCH.

Figure 4:
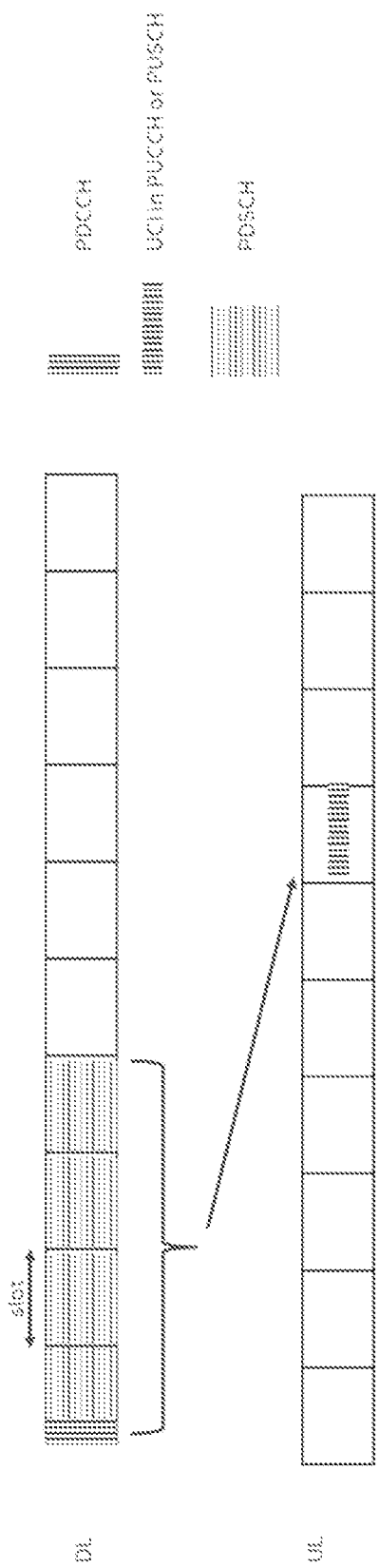
FIG. 4 illustrates multiple physical downlink shared channels (PDSCHs) that are scheduled by a physical downlink control channel (PDCCH) in accordance with an example.

FIG. 4 illustrates an example of multiple physical downlink shared channels (PDSCHs) that are scheduled by a physical downlink control channel (PDCCH). In this example, multiple PDSCHs can be scheduled by a PDCCH and the PDCCH can indicate UCI resources where HARQ feedback of the PDSCHs is concatenated. More specifically, in this example, scheduling DCI in a PDCCH can schedule four PDSCHs and indicate a PUCCH resource where HARQ feedbacks of the PDSCHs can be transmitted, e.g., in a concatenated manner.

In one example, the DCI transmitted in a PDCCH can schedule a PDSCH spanning multiple slots, where the PDSCH can include one or more transport blocks. The HARQ feedbacks of the corresponding transport blocks (TBs) can be concatenated and transmitted in a common UCI resource, such as in a PUCCH or PUSCH.

In one example, the PDCCH scheduling one or more TBs in one or more PDSCHs can indicate one or more of the following information in one or more fields. Such information can include HARQ process IDs of the PDSCHs scheduled and/or an explicit or implicit indication of a number of TBs. The information can include a time domain resource allocation, which can include one or more of a slot offset K0, a start position, a length of one or more PDSCHs or an overall length, i.e., number of slots, offset between consecutive PDSCHs or TBs. The overall length can refer to a total duration of a DL data transmission from a start position, which can include one or more TBs in one or more PDSCHs. The length of each TB can be indicated, so that the UE can identify where one TB ends. In some other designs, the same symbol allocation can be applied across multiple consecutive slots, such as the starting symbol of a first slot and the ending symbol of a last slot within a multi-slot transmission. Further, some resource sets in some slots can be rate-matched due to the presence of a CORESET, synchronization signal (SS) blocks or CSI-RS transmission. Correspondingly, a configured group signaling can include a list of resource block (RB) and symbol level resource set indices forming a union of resource-sets that are not available for a PDSCH transmission or PUSCH reception if a corresponding bit of a rate matching indicator field of the DCI scheduling PDSCH is equal to 1.

In one example, the information can include a frequency domain resource allocation in a given or indicated BW part, which can include a common set of physical resource blocks (PRBs), which can be contiguous or non-contiguous (if all PDSCHs use a same frequency resource allocation) across multiple slots. The frequency domain resource allocation can indicate N=>1 set of PRBs, where the PDSCHs can be put into N groups, and the frequency domain allocation can be the same for all the TBs. Further, the information can include a PUCCH resource indication, which can indicate an index of a PUCCH resource set. Further, the information can include a same or group-common or individual modulation and coding scheme (MCS) indication for the PDSCHs or TBs in each PDSCH scheduled. For group-common, the PDSCHs can be put into N=>1 groups, and for each group, an MCS can be indicated. Further, the information can include a new data indication and a redundancy version (RV) indication for each TB in each PDSCH, and there can be multiple TBs in a PDSCH, e.g., transmitted in a TDM fashion over multiple slots. Further, the information can include a PDSCH to HARQ feedback timing indicator (K1), where K1 can be counted from a last PDSCH scheduled or from the location of where the PDCCH is received. Alternatively, for each PDSCH, a timing indicator can be independently indicated, or PDSCHs can be grouped, and for each group, a timing indicator can be signaled.

In one example, the information can include an identifier for a DCI format, a carrier indicator and/or a BW part indicator, which can be the same, group-common, or individually assigned for the scheduled PDSCHs/TBs. Further, the information can include a virtual RB to physical RB mapping, PRB size bundling, and/or a rate matching indicator. Further, if each PDSCH has more than one transport block, then an MCS, new data indicator (NDI) bit, and RV status information can be included for each TB. Further, the information can include antenna port information, a downlink assignment Index indication, or an indication of multiplexing of HARQ feedbacks corresponding to PDSCHs/TBs scheduled and/or other fields as appropriate from DCI Format 1-0 or Format 1-1 in Release 15 or 16.

Figure 5:
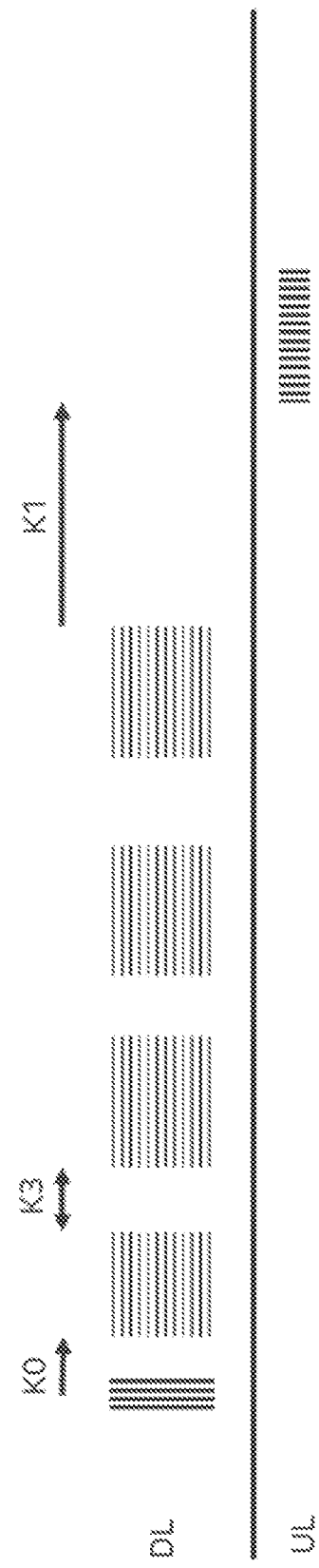
FIG. 5 illustrates a timing relationship of PDSCHs (or transport blocks), a PDCCH and a physical uplink control channel (PUCCH) transmission in accordance with an example.

FIG. 5 illustrates an example of a timing relationship of PDSCHs (or transport blocks), a PDCCH and a physical uplink control channel (PUCCH) transmission. In this example, the PDSCHs can have an offset in between them, i.e., a start position of one PDSCH may not immediately follow a previous PDSCH. A slot offset K0 can be counted from a system frame boundary or from the slot boundary where the PDCCH is received. Further, a start position can indicate a symbol position in the slot after offset, and a length can indicate a number of contiguous symbols. If the PDSCHs are scheduled back to back, then K3 can be zero.

In one example, HARQ process IDs may not be explicitly indicated for the PDSCHs. A rule can be identified to obtain HARQ process IDs. For example, only one HARQ process ID for the first PDSCH can be signaled, and for the remaining PDSCHs, the UE can obtain the IDs by applying a pre-configured offset. A number of PDSCHs scheduled by this PDCCH can be higher layer configured or implicitly derived from the HARQ process ID indicated. In another example, the PDCCH can be transmitted with a configured radio network temporary identifier (RNTI), based on which the UE can identify multiple PDSCHs scheduling. The UE can receive a number of PDSCHs implicitly based on the RNTI used and the PDCCH can indicate a common PRB and length indication for the PDSCHs. After the slot offset, successive PDSCH transmission can start at the start position indicated. K3 can be higher layer configured or can be 1.

In one example, the PDCCH can be assumed to schedule a DL data transmission. However, a similar example can be used for an UL data transmission as well. In one example, the PDCCH can schedule one or more TBs in one or more PUSCHs and can indicate one or more of the following information in one or multiple fields. Such information can include HARQ process IDs/numbers corresponding to the scheduled PUSCHs/TBs. The information an include a time domain resource allocation, which can include one or more of a slot offset K2, a start position, and a length of each PUSCHs or overall length in a number of slots that include all the TBs in one or more PUSCHs assigned by the PDCCH, offset between consecutive PUSCHs. Further, the information can include a frequency domain resource allocation in a given or indicated BW part, which can include a common set of PRBs, which can be contiguous or non-contiguous (if all PUSCHs use a same frequency resource allocation). The frequency domain resource allocation can indicate N=>1 set of PRBs, where each PUSCH can be assigned one of the set or scheduled PUSCHs can be mapped to N groups. The information can include a same or group-common or individual MCS indication for the PUSCHs or for the TBs in each PUSCH scheduled. For group-common, the PUSCHs can be mapped to N=>1 groups, and for each group, an MCS can be indicated. Further, the information an include a new data indication and RV indication for each TB in each PUSCH, a transmit power command (TPC) command for the scheduled PUSCHs, an identifier for a DCI format, a BW part indicator (which can be same, group-common, or individually assigned for the scheduled PUSCHs/TBs), padding bits (if needed) and/or other fields as appropriate from DCI Format 0-0 or Format 0-1 in Release 15 or 16.

In another example, the network can schedule an UL and/or DL transmission spanning multiple slots or symbol group and also provide an indication to the UE to skip PDCCH monitoring during the scheduled DL or UL transmission spanning multiple slots or symbol group. In this context, the UL (DL) transmission can comprise one or multiple PUSCHs or TBs (PDSCHs or TBs) or repetition of a PUSCH or TB (PDSCH or TB). The scheduling of data over multiple slots can be conveyed in a single scheduling DCI or multiple scheduling DCIs in a slot. In some other design, the UE can only skip PDCCH monitoring for PDSCH assignments but still keep monitoring the PDCCH for PUSCH scheduling, or vice versa. In one example, the UE can otherwise skip monitoring for any other PDCCH during PDSCH reception, except when PDCCH for PUSCH scheduling can be transmitted. This can be controlled by the network using a DCI format that schedules a PDSCH or PUSCH transmission, as further detailed below, which is desirable to provide flexibility for the network (or gNB).

In yet another example, the UE can identify whether to skip PDCCH monitoring for a duration of X=>1 slots, based on one or more of an explicit and/or implicit indication. The explicit indication can be dynamically indicated in the DCI or via a higher layer e.g., UE specific RRC signaling. The implicit indication can be conveyed via values of some other parameters conveyed in DCI or higher layer signaling or based on one or more fulfilled conditions. In one example, the indication can be conveyed via one or more of the following signaling or conditions fulfilled.

For example, the indication can be conveyed, where the indication is received in a field in the scheduling DCI, and the indication can be one bit in a field. Further, the indication can be conveyed if an indicated time domain duration is equal to or larger than P>1 slots. Further, the indication can be conveyed if the DCI is received in a given CORESET ID, where the given CORESET ID can be identified based on prior higher layer signaling. Further, the indication can be conveyed if the DCI is received in a given search space within a given or configured CORESET, where the given search space can be identified based on prior higher layer signaling. Further, the indication can be conveyed if multiple DCIs received in a slot schedule respective PDSCH(s) in overlapping or subsequent slots. Further, the indication can be conveyed if a DCI schedules a PDSCH/PUSCH/TB repetition over N>1 consecutive slots, where consecutive DL or UL slots can be contiguous or non-contiguous. Further, the indication can be conveyed if the DCI is of a certain size or a given format or contains a given RNTI. Further, the indication can be conveyed if a certain BW part is indicated for data transmission.

In one example, a number of slots X that the UE skips PDCCH monitoring can be higher layer configured or can be implicitly obtained from another parameter or a condition fulfilled. In another example, parameter X can be dynamically indicated in the scheduling DCI, i.e., UL or DL scheduling grant in a PDCCH. In some designs, the PDCCH monitoring skipping can be determined by the UE at least based on the overlapping between a scheduled PDSCH and PDCCH occasion and the K0 values configured by gNB through RRC signaling.

In one example, PDCCH skipping can imply for the configured or indication duration of X slots, the UE does not attempt to monitor for any DCI format in the configured search spaces in the CORESETs in the current active BW part. However, optionally, UE can still receive other DL transmission such as CSI-RS or synchronization signal block (SSB) during the duration.

In one example, X=P−1, i.e., if a PDCCH schedules a DL data transmission over P slots and data transmission starts in the same slot where the PDCCH is received, then the UE can skip PDCCH monitoring for P−1 subsequent slots after the PDCCH reception. In another example, if the data transmission does not start in the same slot where the PDCCH is received, X can be equal to P slots. On the other hand, if the PDCCH schedules UL data over P slots, then X can be equal or less than P.

In one configuration, in a third technique, to improve power saving, the UE can be allowed to sleep whenever possible. One way to increase UE sleep duration is to trigger go-to-sleep signaling or PDCCH monitoring skipping. Such signaling can be transmitted in a UE specific DCI. However, a new DCI format for just this purpose may not be profitable due to the increased UE blind decoding burden. Hence, one option can be incorporate one or more power saving signaling in one or more existing fields in the scheduling DCI, although this may come at the expense of flexibility. One or more bits from the following fields in a DL scheduling grant can be used for power saving signaling: time domain resource assignment, frequency domain resource assignment, MCS bits or antenna ports.

In one example, a power saving signaling trigger can be a go-to-sleep-trigger, e.g., 1 bit. The UE can go to sleep for a configured or indicated duration after a PDSCH transmission ends. Here, go-to-sleep can imply the UE skips PDCCH monitoring once the trigger is received. The UE can still receive measurement reference signals when the UE skips the PDCCH monitoring. In another example, the power saving signaling can be PDCCH occasions skipping, e.g., 1 bit. For example, the UE can skip following N=>1 occasions based on the trigger. In yet another example, the power saving signaling can be switching off one or more search space sets or CORESETs for a configured duration, e.g., one bit. Upon receiving the trigger, the UE can skip one or more CORESETs or search space (SS) sets within a given CORESET for a configured duration.

In one example, even though the UE can receive a trigger to go-to-sleep or skip PDCCH monitoring or skip one or more SS sets, the UE can still monitor CSI-RS and/or SSB/and/or TRS. Further, it may be possible that when the UE is expecting to save power, the network may not use all the bits in fields for full flexible scheduling, and rather use some of the bits in one or more fields for other purposes, such as power saving signaling.

In one configuration, in a technique for new radio (NR) communications, a UE can receive in a first bandwidth part, control signaling, where the control signaling can indicate an index of a second BW part. The control signaling can further indicate a CSI RS resource in a second BW part. The UE can retune to the second BW part. The UE can receive a CSI-RS resource in the second BW part.

In one example, the control signaling can be received by an UL scheduling grant in a PDCCH. In another example, the CSI-RS resource can be an aperiodic CSI-RS resource (i.e., one instance of a CSI RS transmission). In yet another example, the PDCCH can indicate an offset to the CSI-RS resource. Further, the PDCCN can include a field that indicates an index of a CSI RS resource configuration or resource set, and a BW part index of the second BW part. Further, the control signaling can be wake-up signaling for the UE (i.e., if the UE is operating in a DRX mode).

In one configuration, in a technique for NR communications, a UE can receive a scheduling DCI in a PDCCH, where the PDCCH can schedule DL data (one or more PDSCH(s)) transmission(s) over more than one slots. The UE can receive the DL data transmission, where a PDCCH monitoring occasion occurs during DL data reception. The UE can skip monitoring for the PDCCH during the DL transmission at the PDCCH monitoring occasion.

In one example, the DCI can include a bit field which indicates a trigger to skip PDCCH monitoring. In another example, the duration for which the UE skips PDCCH monitoring can be implicitly derived from the duration of the DL data transmission. In yet another example, the PDCCH can schedule multiple transport blocks over multiple slots. Further, HARQ feedback of the transport blocks can be concatenated and transmitted in one UCI message.

Figure 6:
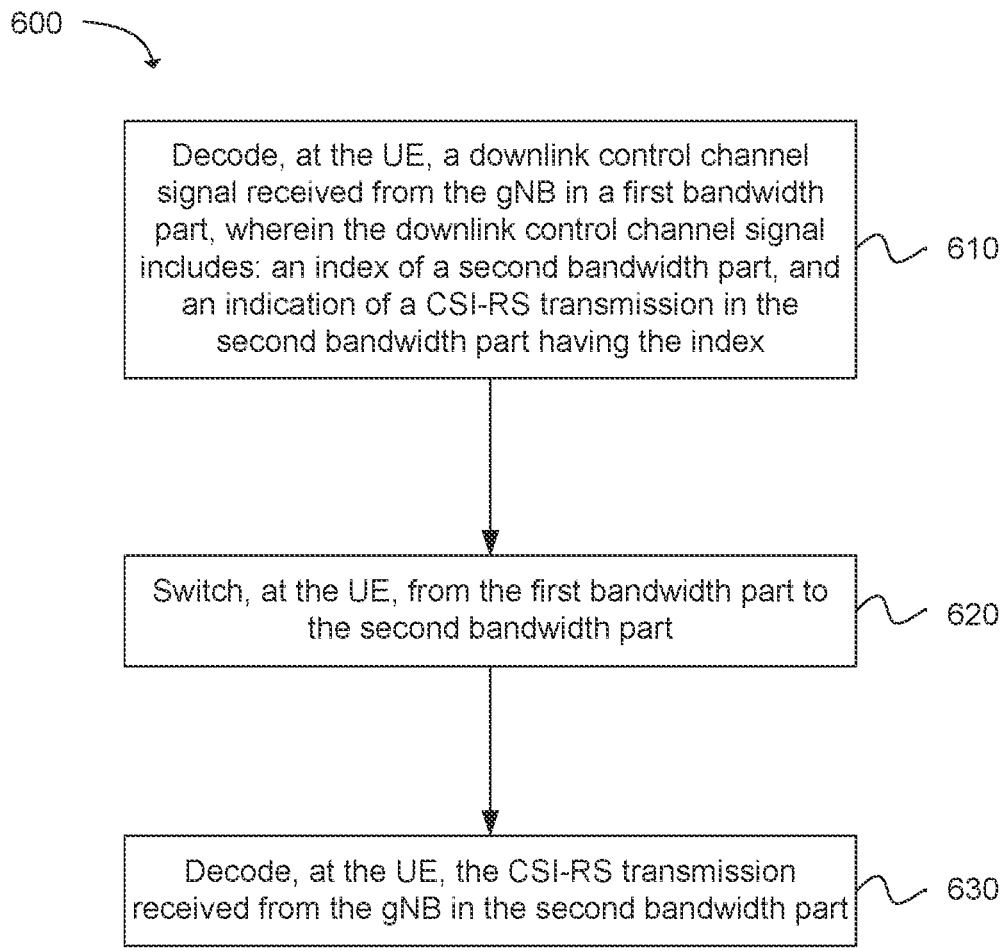
FIG. 6 depicts functionality of a user equipment (UE) operable to decode a channel state information reference signal (CSI-RS) resource received from a Next Generation NodeB (gNB) in accordance with an example.

Another example provides functionality 600 of a user equipment (UE) operable to decode a channel state information reference signal (CSI-RS) resource received from a Next Generation NodeB (gNB), as shown in FIG. 6. The UE can comprise one or more processors configured to decode, at the UE, a downlink control channel signal received from the gNB in a first bandwidth part, wherein the downlink control channel signal includes: an index of a second bandwidth part, and an indication of a CSI-RS transmission in the second bandwidth part having the index, as in block 610. The UE can comprise one or more processors configured to switch, at the UE, from the first bandwidth part to the second bandwidth part, as in block 620. The UE can comprise one or more processors configured to decode, at the UE, the CSI-RS transmission received from the gNB in the second bandwidth part, as in block 630. In addition, the UE can comprise a memory interface configured to send to a memory the downlink control channel signal.

Figure 7:
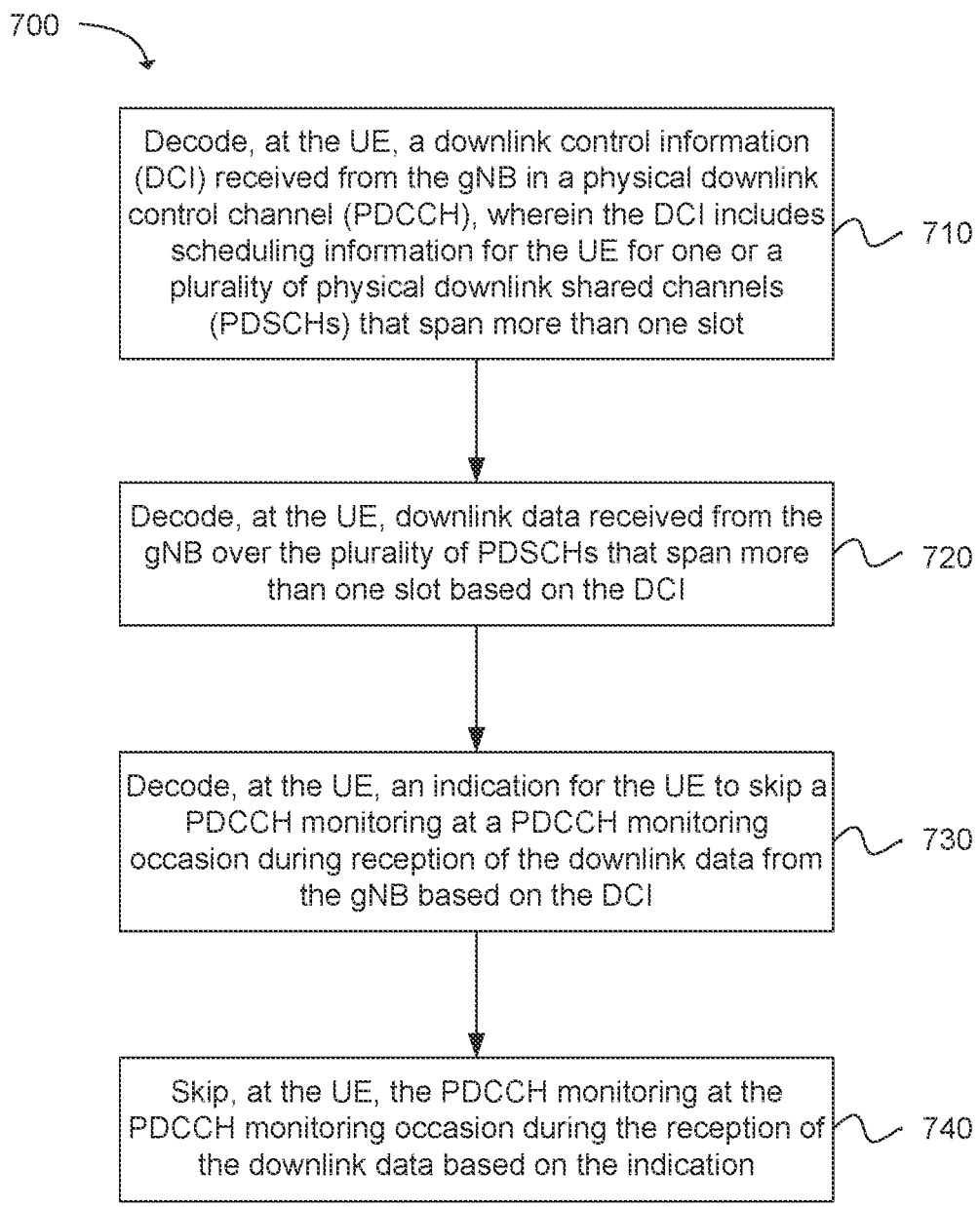
FIG. 7 depicts functionality of a user equipment (UE) operable to decode downlink data received from a Next Generation NodeB (gNB) in accordance with an example.

Another example provides functionality 700 of a user equipment (UE) operable to decode downlink data received from a Next Generation NodeB (gNB), as shown in FIG. 7. The UE can comprise one or more processors configured to decode, at the UE, a downlink control information (DCI) received from the gNB in a physical downlink control channel (PDCCH), wherein the DCI includes scheduling information for the UE for one or a plurality of physical downlink shared channels (PDSCHs) that span more than one slot, as in block 710. The UE can comprise one or more processors configured to decode, at the UE, downlink data received from the gNB over the plurality of PDSCHs that span more than one slot based on the DCI, as in block 720. The UE can comprise one or more processors configured to decode, at the UE, an indication for the UE to skip a PDCCH monitoring at a PDCCH monitoring occasion during reception of the downlink data from the gNB based on the DCI, as in block 730. The UE can comprise one or more processors configured to skip, at the UE, the PDCCH monitoring at the PDCCH monitoring occasion during the reception of the downlink data based on the indication, as in block 740. In addition, the UE can comprise a memory interface configured to send to a memory the DCI.

Figure 8:
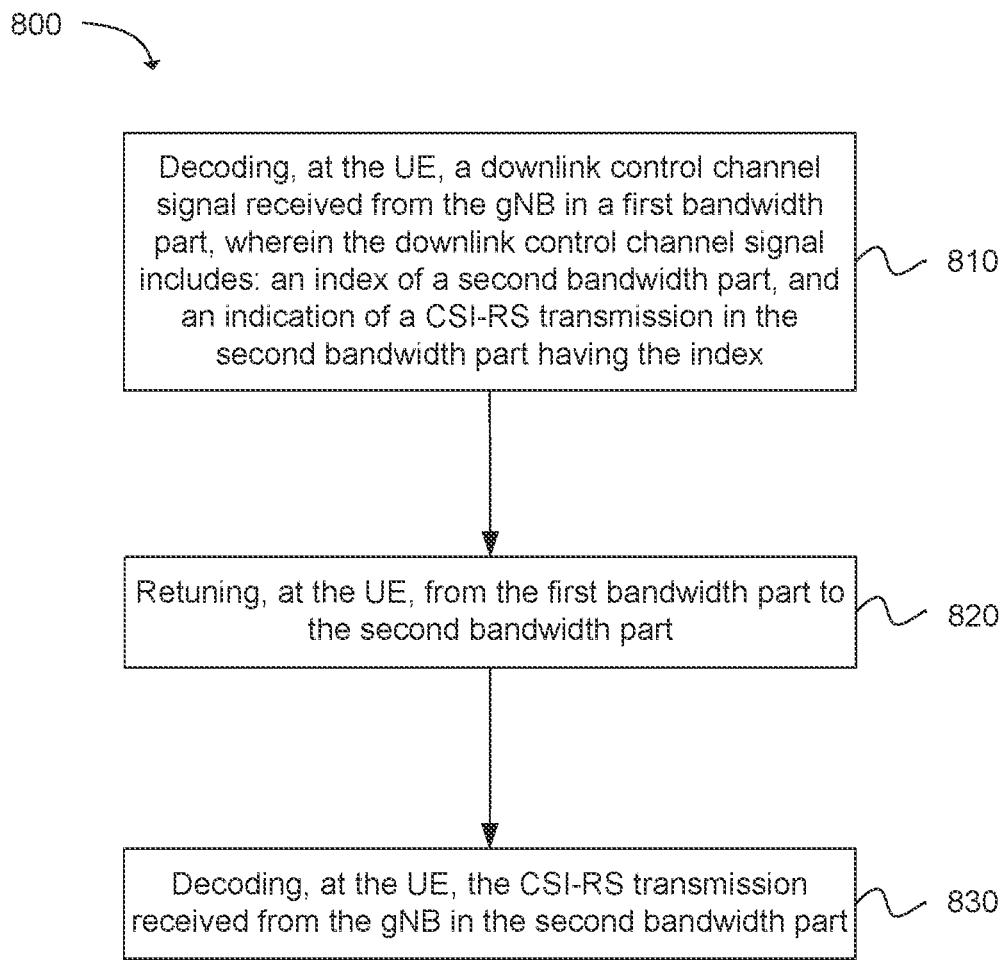
FIG. 8 depicts a flowchart of a machine readable storage medium having instructions embodied thereon for decoding a channel state information reference signal (CSI-RS) resource received from a Next Generation NodeB (gNB) in accordance with an example.

Another example provides at least one machine readable storage medium having instructions 800 embodied thereon for decoding a channel state information reference signal (CSI-RS) resource received from a Next Generation NodeB (gNB), as shown in FIG. 8. The instructions can be executed on a machine, where the instructions are included on at least one computer readable medium or one non-transitory machine readable storage medium. The instructions when executed by one or more processors perform: decoding, at the UE, a downlink control channel signal received from the gNB in a first bandwidth part, wherein the downlink control channel signal includes: an index of a second bandwidth part, and an indication of a CSI-RS transmission in the second bandwidth part having the index, as in block 810. The instructions when executed by one or more processors perform: retuning, at the UE, from the first bandwidth part to the second bandwidth part, as in block 820. The instructions when executed by one or more processors perform: decoding, at the UE, the CSI-RS transmission received from the gNB in the second bandwidth part, as in block 830.

Figure 9:
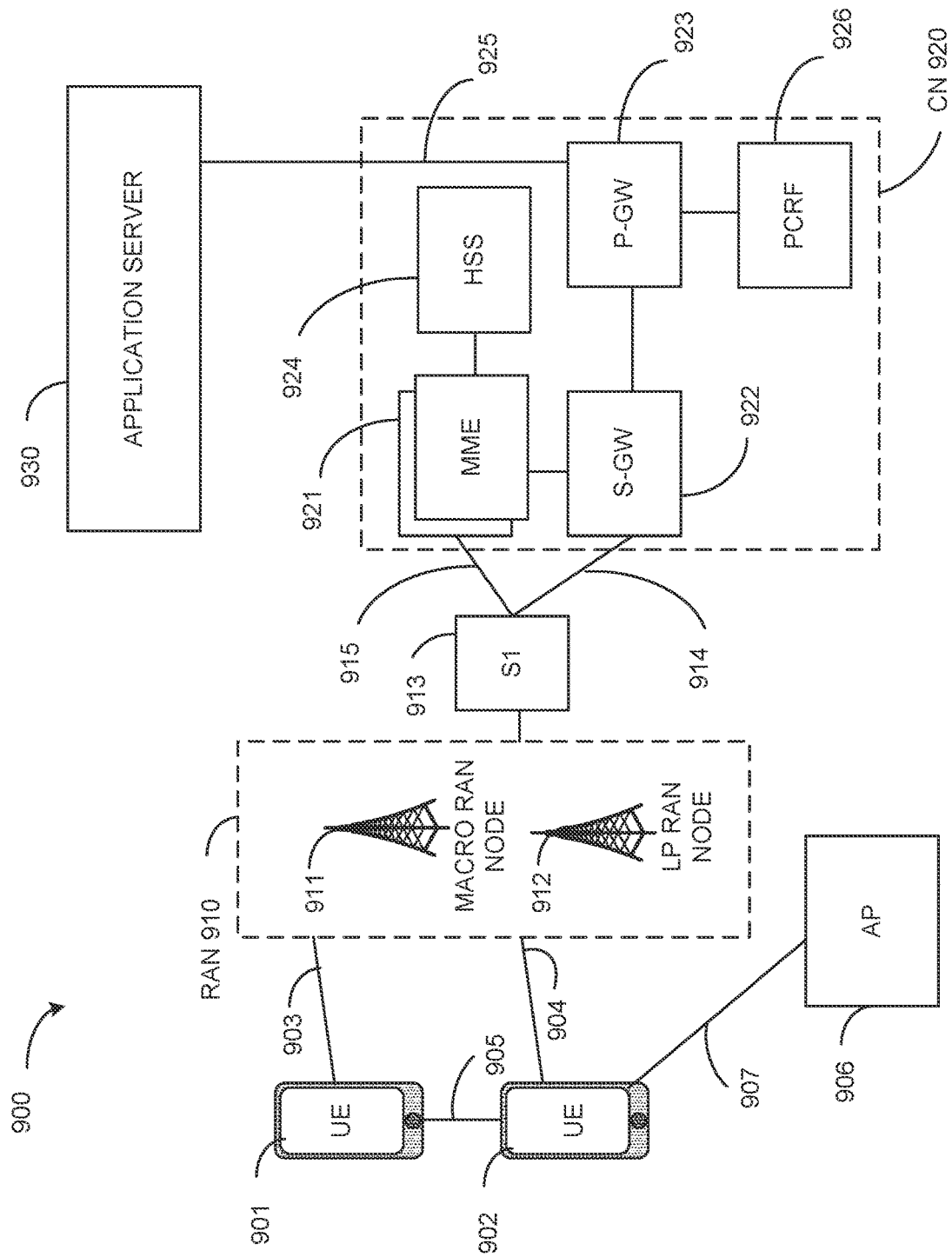
FIG. 9 illustrates an architecture of a wireless network in accordance with an example.

FIG. 9 illustrates an architecture of a system 900 of a network in accordance with some embodiments. The system 900 is shown to include a user equipment (UE) 901 and a UE 902. The UEs 901 and 902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN) 910—the RAN 910 may be, for example, an Evolved Universal Mobile Telecommunications System (UMTS) Terrestrial Radio Access Network (E-UTRAN), a NextGen RAN (NG RAN), or some other type of RAN. The UEs 901 and 902 utilize connections 903 and 904, respectively, each of which comprises a physical communications interface or layer (discussed in further detail below); in this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 902 is shown to be configured to access an access point (AP) 906 via connection 907. The connection 907 can comprise a local wireless connection, such as a connection consistent with any IEEE 802.11 protocol, wherein the AP 906 would comprise a wireless fidelity (WiFi®) router. In this example, the AP 906 is shown to be connected to the Internet without connecting to the core network of the wireless system (described in further detail below).

The RAN 910 can include one or more access nodes that enable the connections 903 and 904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the RAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 901 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 910 is shown to be communicatively coupled to a core network (CN) 920—via an S1 interface 913. In embodiments, the CN 920 may be an evolved packet core (EPC) network, a NextGen Packet Core (NPC) network, or some other type of CN. In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMEs 921.

In this embodiment, the CN 920 comprises the MMEs 921, the S-GW 922, the Packet Data Network (PDN) Gateway (P-GW) 923, and a home subscriber server (HSS) 924. The MMEs 921 may be similar in function to the control plane of legacy Serving General Packet Radio Service (GPRS) Support Nodes (SGSN). The MMEs 921 may manage mobility aspects in access such as gateway selection and tracking area list management. The HSS 924 may comprise a database for network users, including subscription-related information to support the network entities' handling of communication sessions. The CN 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the S1 interface 913 towards the RAN 910, and routes data packets between the RAN 910 and the CN 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the EPC network 923 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the CN 920.

The P-GW 923 may further be a node for policy enforcement and charging data collection. Policy and Charging Enforcement Function (PCRF) 926 is the policy and charging control element of the CN 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 926 may be communicatively coupled to the application server 930 via the P-GW 923. The application server 930 may signal the PCRF 926 to indicate a new service flow and select the appropriate Quality of Service (QoS) and charging parameters. The PCRF 926 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
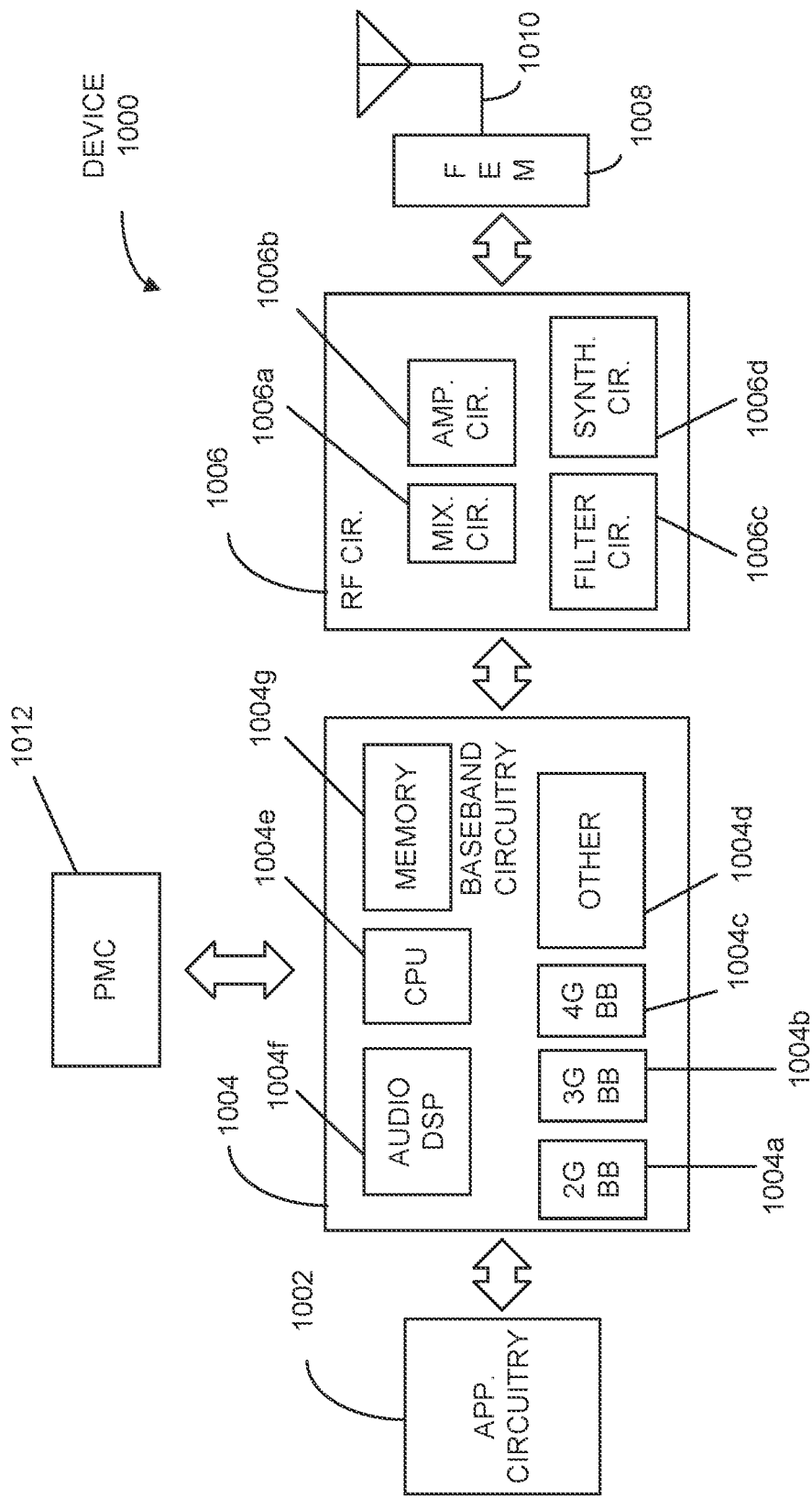
FIG. 10 illustrates a diagram of a wireless device (e.g., UE) in accordance with an example.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004a, a fourth generation (4G) baseband processor 1004b, a fifth generation (5G) baseband processor 1004c, or other baseband processor(s) 1004d for other existing generations, generations in development or to be developed in the future (e.g., second generation (2G), sixth generation (6G), etc.). The baseband circuitry 1004 (e.g., one or more of baseband processors 1004a-d) may handle various radio control functions that enable communication with one or more radio networks via the RF circuitry 1006. In other embodiments, some or all of the functionality of baseband processors 1004a-d may be included in modules stored in the memory 1004g and executed via a Central Processing Unit (CPU) 1004e. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004f. The audio DSP(s) 1004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO). Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 10 12 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, the device 1000 transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
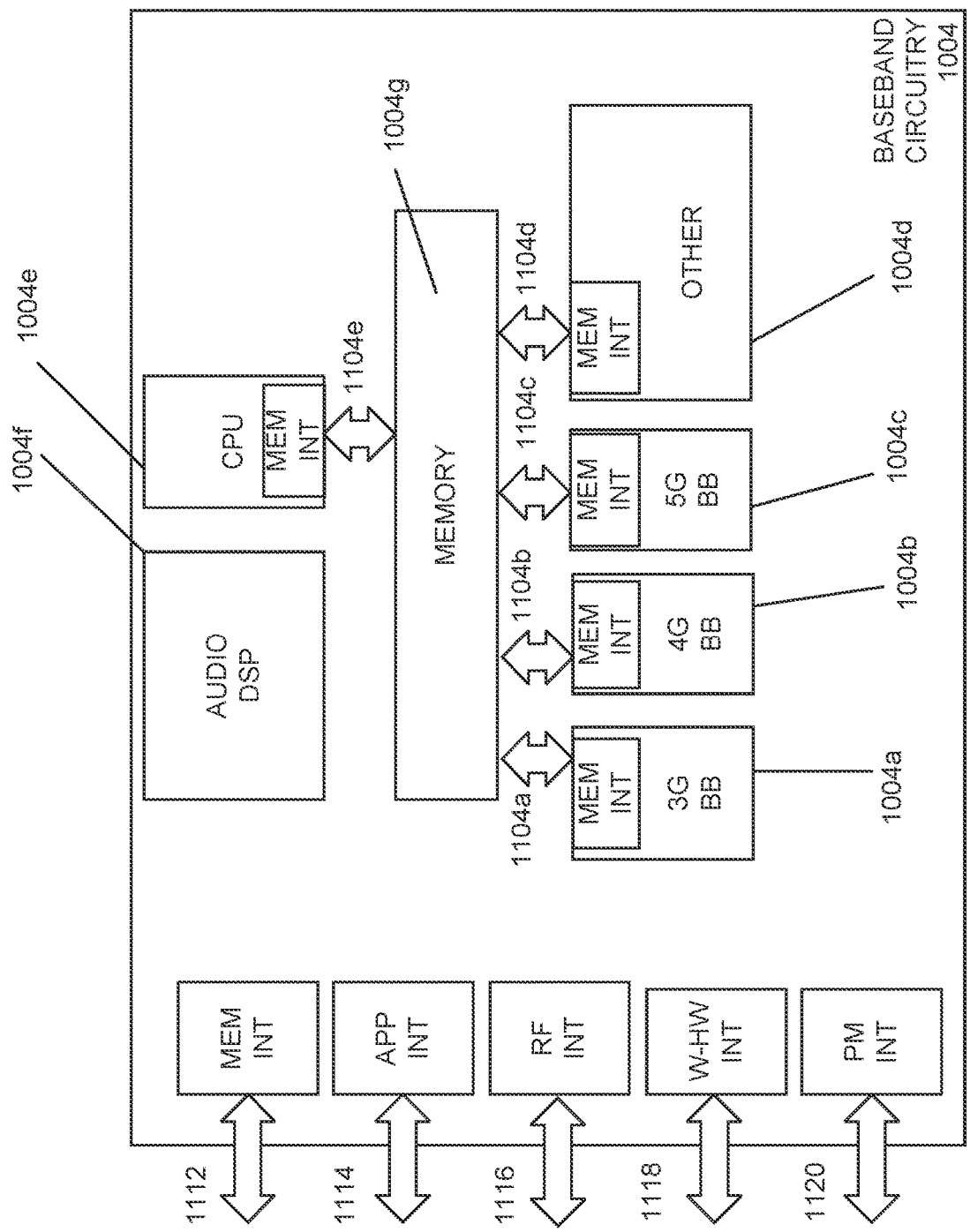
FIG. 11 illustrates interfaces of baseband circuitry in accordance with an example.

FIG. 11 illustrates example interfaces of baseband circuitry in accordance with some embodiments. As discussed above, the baseband circuitry 1004 of FIG. 10 may comprise processors 1004a-1004e and a memory 1004g utilized by said processors. Each of the processors 1004a-1004e may include a memory interface, 1104a-1104e, respectively, to send/receive data to/from the memory 1004g.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012.

Figure 12:
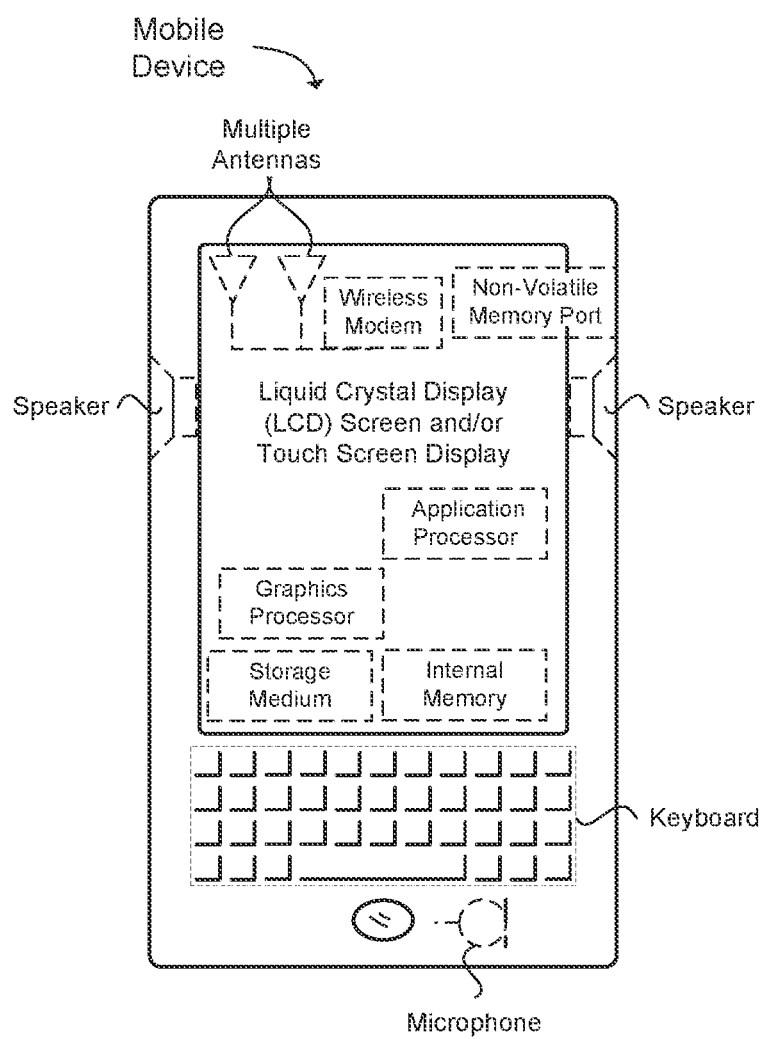
FIG. 12 illustrates a diagram of a wireless device (e.g., UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to decode a channel state information reference signal (CSI-RS) resource received from a Next Generation NodeB (gNB), the apparatus comprising: decode, at the UE, a downlink control channel signal received from the gNB in a first bandwidth part, wherein the downlink control channel signal includes: an index of a second bandwidth part, and an indication of a CSI-RS transmission in the second bandwidth part having the index; switch, at the UE, from the first bandwidth part to the second bandwidth part; and decode, at the UE, the CSI-RS transmission received from the gNB in the second bandwidth part; and a memory interface configured to send to a memory the downlink control channel signal.

Example 2 includes the apparatus of Example 1, further comprising a transceiver configured to: receive the downlink control channel signal from the gNB; and receive the CSI-RS from the gNB.

Example 3 includes the apparatus of any of Examples 1 to 2, wherein the CSI-RS is transmitted in an aperiodic CSI-RS resource, wherein the aperiodic CSI-RS resource is one instance of a CSI-RS transmission, wherein downlink control information (DCI) indicates the aperiodic CSI-RS resource of an aperiodic CSI RS transmission in the second bandwidth part.

Example 4 includes the apparatus of any of Examples 1 to 3, wherein the one or more processors are configured to decode the downlink control channel signal received by an uplink scheduling grant in downlink control information (DCI) in a physical downlink control channel (PDCCH).

Example 5 includes the apparatus of any of Examples 1 to 4, wherein the DCI in the PDCCH indicates a time offset from the downlink control channel signal in the first bandwidth part to the CSI-RS resource in the second bandwidth part.

Example 6 includes the apparatus of any of Examples 1 to 5, wherein: the DCI in the PDCCH includes a field, wherein the field indicates an index of a CSI-RS resource configuration or resource set, and the index of the second bandwidth part; or the DCI in the PDCCH includes a first field that indicates an index of a CSI-RS resource configuration or resource set, and a second field that indicates the index of the second bandwidth part.

Example 7 includes the apparatus of any of Examples 1 to 6, wherein the downlink control channel signal is a wakeup signal for the UE when the UE is operating in a discontinuous reception (DRX) mode.

Example 8 includes the apparatus of any of Examples 1 to 7, wherein the CSI-RS is a periodic CSI-RS resource.

Example 9 includes an apparatus of a user equipment (UE) operable to decode downlink data received from a Next Generation NodeB (gNB), the apparatus comprising: decode, at the UE, a downlink control information (DCI) received from the gNB in a physical downlink control channel (PDCCH), wherein the DCI includes scheduling information for the UE for one or a plurality of physical downlink shared channels (PDSCHs) that span more than one slot; decode, at the UE, downlink data received from the gNB over the plurality of PDSCHs that span more than one slot based on the DCI; decode, at the UE, an indication for the UE to skip a PDCCH monitoring at a PDCCH monitoring occasion during reception of the downlink data from the gNB based on the DCI; and skip, at the UE, the PDCCH monitoring at the PDCCH monitoring occasion during the reception of the downlink data based on the indication; and a memory interface configured to send to a memory the DCI.

Example 10 includes the apparatus of Example 9, further comprising a transceiver configured to: receive the DCI from the gNB; and receive the downlink data from the gNB.

Example 11 includes the apparatus of any of Examples 9 to 10, wherein the DCI includes a bit field with the indication to skip the PDCCH monitoring at the PDCCH monitoring occasion during reception of the downlink data.

Example 12 includes the apparatus of any of Examples 9 to 11, wherein the one or more processors are configured to skip the PDCCH monitoring at the PDCCH monitoring occasion for a duration which is implicitly derived from a duration of the downlink data received over the more than one slot.

Example 13 includes the apparatus of any of Examples 9 to 12, wherein the DCI in the PDCCH schedules one or multiple transport blocks over multiple slots.

Example 14 includes the apparatus of any of Examples 9 to 13, wherein the one or more processors are configured to: concatenate multiple hybrid automatic repeat request (HARQ) feedbacks for the downlink data to form concatenated HARQ feedback; and encode a single uplink control information (UCI) message that includes the concatenated HARQ feedback for transmission to the gNB.

Example 15 includes at least one machine readable storage medium having instructions embodied thereon for decoding a channel state information reference signal (CSI-RS) resource received from a Next Generation NodeB (gNB), the instructions when executed by one or more processors perform the following: decoding, at the UE, a downlink control channel signal received from the gNB in a first bandwidth part, wherein the downlink control channel signal includes: an index of a second bandwidth part, and an indication of a CSI-RS transmission in the second bandwidth part having the index; retuning, at the UE, from the first bandwidth part to the second bandwidth part; and decoding, at the UE, the CSI-RS transmission received from the gNB in the second bandwidth part.

Example 16 includes the at least one machine readable storage medium of Example 15, wherein the CSI-RS is transmitted in an aperiodic CSI-RS resource, wherein the aperiodic CSI-RS resource is one instance of a CSI-RS transmission, wherein downlink control information (DCI) indicates the aperiodic CSI-RS resource of an aperiodic CSI RS transmission in the second bandwidth part.

Example 17 includes the at least one machine readable storage medium of any of Examples 15 to 16, further comprising instructions when executed perform the following: decoding the downlink control channel signal received by an uplink scheduling grant in downlink control information (DCI) in a physical downlink control channel (PDCCH).

Example 18 includes the at least one machine readable storage medium of any of Examples 15 to 17 wherein the DCI in the PDCCH indicates a time offset from the downlink control channel signal in the first bandwidth part to the CSI-RS resource in the second bandwidth part.

Example 19 includes the at least one machine readable storage medium of any of Examples 15 to 18, wherein: the DCI in the PDCCH includes a field, wherein the field indicates an index of a CSI-RS resource configuration or resource set, and the index of the second bandwidth part; or the DCI in the PDCCH includes a first field that indicates an index of a CSI-RS resource configuration or resource set, and a second field that indicates the index of the second bandwidth part.

Example 20 includes the at least one machine readable storage medium of any of Examples 15 to 19, wherein the downlink control channel signal is a wakeup signal for the UE when the UE is operating in a discontinuous reception (DRX) mode.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a New Radio (NR) User Equipment (UE), the apparatus including a memory, and one or more processors coupled to the memory, the one or more processors to:
   decode a downlink control information (DCI) indicating a joint scheduling of multiple physical downlink shared channels (PDSCHs), the DCI including signaling comprising information to trigger the UE to perform physical downlink control channel (PDCCH) monitoring skipping, the signaling occupying one bit;
   determine the joint scheduling from the DCI;
   skip one or more PDCCH monitoring occasions based on the signaling; and
   decode the multiple PDSCHs based on the joint scheduling.

2. The apparatus of claim 1, wherein individual ones of the PDSCHs occupy a slot or a group of slots.

3. The apparatus of claim 1, wherein the information to trigger the UE includes information based on a duration of the PDCCH monitoring skipping.

4. The apparatus of claim 1, wherein the signaling corresponds to first signaling, the DCI including:
   second signaling including information to trigger the UE to switch off one or more search space sets,
   the one or more processors to further switch off the one or more search space sets based on the second signaling.

5. The apparatus of claim 4, wherein the second signaling occupies one bit.

6. The apparatus of claim 4, wherein information to trigger the UE to switch off one or more search space sets includes information based on a duration of a switching off of the one or more search space sets.

7. The apparatus of claim 1, further including a radio front end module coupled to the one or more processors.

8. The apparatus of claim 7, further including an antenna array coupled to the radio front end module.

9. A tangible non-transitory machine-readable medium including code which, when executed by one or more processors of a New Radio (NR) User Equipment (UE), cause the one or more processors to perform operations including:
- decoding a downlink control information (DCI) indicating a joint scheduling of multiple physical downlink shared channels (PDSCHs), the DCI including signaling comprising information to trigger the UE to perform physical downlink control channel (PDCCH) monitoring skipping, the signaling occupying one bit;
- determining the joint scheduling from the DCI;
- skipping one or more PDCCH monitoring occasions based on the signaling; and
- decoding the multiple PDSCHs based on the joint scheduling.

10. The tangible non-transitory machine-readable medium of claim 9, wherein individual ones of the PDSCHs occupy a slot or a group of slots.

11. An apparatus of a New Radio (NR) Node B (gNodeB), the apparatus including a memory, and one or more processors coupled to the memory, the one or more processors to:
- encode a downlink control information (DCI) indicating a joint scheduling of multiple physical downlink shared channels (PDSCHs)), the DCI including signaling comprising information to trigger a NR User Equipment (NR UE) to perform physical downlink control channel (PDCCH) monitoring skipping, the signaling occupying one bit;
- send for transmission the DCI to the NR UE;
- encode the multiple PDSCHs based on the joint scheduling; and
- send the multiple PDSCHs for transmission to the NR UE.

12. The apparatus of claim 11, wherein information to trigger the UE includes information based on a duration of the PDCCH monitoring skipping.

13. The apparatus of claim 11, wherein the signaling corresponds to first signaling, the DCI including:
- second signaling including information to trigger the UE to switch off one or more search space sets,
- the one or more processors to further send for transmission the second signaling to the UE.

14. The apparatus of claim 13, wherein information to trigger the UE to switch off one or more search space sets includes information based on a duration of a switching off of the one or more search space sets.

15. The apparatus of claim 11, further including a radio front end module coupled to the one or more processors.

16. The apparatus of claim 15, further including an antenna array coupled to the radio front end module.

* * * * *